United States Patent
Jeffryes

(10) Patent No.: US 10,927,658 B2
(45) Date of Patent: Feb. 23, 2021

(54) DRILLING SYSTEM CONTROL FOR REDUCING STICK-SLIP BY CALCULATING AND REDUCING ENERGY OF UPGOING ROTATIONAL WAVES IN A DRILLSTRING

(71) Applicant: SCHLUMBERGER TECHNOLOGY CORPORATION, Sugar Land, TX (US)

(72) Inventor: Benjamin Peter Jeffryes, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 881 days.

(21) Appl. No.: 14/778,626

(22) PCT Filed: Mar. 19, 2014

(86) PCT No.: PCT/IB2014/059978
§ 371 (c)(1),
(2) Date: Sep. 21, 2015

(87) PCT Pub. No.: WO2014/147575
PCT Pub. Date: Sep. 25, 2014

(65) Prior Publication Data
US 2016/0047219 A1 Feb. 18, 2016

Related U.S. Application Data

(60) Provisional application No. 61/803,686, filed on Mar. 20, 2013.

(51) Int. Cl.
*E21B 44/02* (2006.01)
*E21B 44/00* (2006.01)
(Continued)

(52) U.S. Cl.
CPC ............ *E21B 44/02* (2013.01); *E21B 3/02* (2013.01); *E21B 44/00* (2013.01); *G05B 19/401* (2013.01); *G05B 2219/45129* (2013.01)

(58) Field of Classification Search
CPC .......... E21B 44/02; E21B 3/02; E21B 44/00; B06L 15/20; F02D 31/00; G05D 13/00
See application file for complete search history.

(56) References Cited

U.S. PATENT DOCUMENTS

| 4,793,421 A | 12/1988 | Turner et al. |
| 4,854,397 A | 8/1989 | Warren et al. |

(Continued)

FOREIGN PATENT DOCUMENTS

| CN | 1798903 A | 7/2006 |
| EP | 0774563 A2 | 5/1997 |

(Continued)

OTHER PUBLICATIONS

Merriam-Webster dictionary, Definition of the word top. [online] [Retrieved Jan. 3, 2019] Retrieved from the Internet: <URL: http://merriam-webster.com/dictionary/top> (Year: 2018).*

(Continued)

*Primary Examiner* — Robert E Fennema
*Assistant Examiner* — Jonathan Michael Skrzycki
(74) *Attorney, Agent, or Firm* — Jeffrey D. Frantz

(57) ABSTRACT

An apparatus and method for controlling a drilling system in a manner that reduces stick-slip by receiving a desired rotation speed $v_0$ of the drive system to rotate the drillstring, receiving property measurements of the drilling system, and deriving therefrom a rotation speed $v_{up}$ of upgoing rotational waves of the drillstring associated with upgoing rotational energy in the drillstring. An actual rotation speed v of the drive system to rotate the drillstring is determined by representing downgoing energy in the drillstring as a math- (Continued)

ematical expression containing a sum of downgoing rotational energy produced by the drive system and downgoing rotational energy caused by the upgoing rotational waves that are reflected downwardly at an upper end of the drillstring, and then optimizing the mathematical expression, which is then used for controlling the drive system to rotate the drillstring at v.

16 Claims, 2 Drawing Sheets

(51) Int. Cl.
*E21B 3/02* (2006.01)
*G05B 19/401* (2006.01)

(56) References Cited

U.S. PATENT DOCUMENTS

| | | |
|---|---|---|
| 5,117,926 A | 6/1992 | Worrall et al. |
| 5,205,163 A | 4/1993 | Sananikone |
| 5,259,468 A | 11/1993 | Warren et al. |
| 5,368,108 A | 11/1994 | Aldred et al. |
| 5,390,748 A | 2/1995 | Goldman |
| 5,433,279 A | 7/1995 | Tessari et al. |
| 5,467,832 A | 11/1995 | Orban et al. |
| 5,474,142 A | 12/1995 | Bowden |
| 5,738,178 A | 4/1998 | Williams et al. |
| 5,842,149 A | 11/1998 | Harrell et al. |
| 6,050,348 A | 4/2000 | Richarson et al. |
| 6,166,654 A | 12/2000 | Van Den Steen |
| 6,327,539 B1 | 12/2001 | Keultjes et al. |
| 6,338,390 B1 | 1/2002 | Tibbitts |
| 6,382,331 B1 | 5/2002 | Pinckard |
| 6,802,378 B2 | 10/2004 | Haci et al. |
| 7,152,696 B2 | 12/2006 | Jones |
| 7,404,454 B2 | 7/2008 | Hulick |
| 7,461,705 B2 | 12/2008 | Hulick et al. |
| 7,588,100 B2 | 9/2009 | Hamilton |
| 7,802,634 B2 | 9/2010 | Boone |
| 7,823,655 B2 | 11/2010 | Boone et al. |
| 8,360,171 B2 | 1/2013 | Boone et al. |
| 8,387,720 B1 | 3/2013 | Keast et al. |
| 8,528,663 B2 | 9/2013 | Boone |
| 8,550,183 B2 | 10/2013 | Forster et al. |
| 8,602,126 B2 | 12/2013 | Boone et al. |
| 8,672,055 B2 | 3/2014 | Boone et al. |
| 8,689,906 B2 | 4/2014 | Nessjoen et al. |
| RE44,956 E | 6/2014 | Richardson et al. |
| RE44,973 E | 7/2014 | Richardson et al. |
| 8,833,488 B2 | 9/2014 | Knudsen et al. |
| 8,939,233 B2 | 1/2015 | Edbury et al. |
| 8,939,234 B2 | 1/2015 | Mebane, III et al. |
| 8,950,512 B2 | 2/2015 | Nessjoen et al. |
| 8,977,523 B2 | 3/2015 | Ertas et al. |
| 9,249,655 B1 | 2/2016 | Keast et al. |
| 9,290,995 B2 | 3/2016 | Boone et al. |
| 9,359,881 B2 | 6/2016 | DiSantis |
| 9,506,336 B2 | 11/2016 | Orbell |
| 9,581,008 B2 | 2/2017 | Kyllingstad |
| 9,593,567 B2 | 3/2017 | Pink et al. |
| 9,598,904 B2 | 3/2017 | Aldred et al. |
| 9,650,880 B2 | 5/2017 | Bowley et al. |
| 2003/0168257 A1 | 9/2003 | Aldred et al. |
| 2004/0256152 A1 | 12/2004 | Dashevskiy et al. |
| 2007/0061047 A1* | 3/2007 | Sato ............ G05D 19/02 700/280 |
| 2011/0186353 A1 | 8/2011 | Turner et al. |
| 2011/0232966 A1 | 9/2011 | Kyllingstad |
| 2011/0245980 A1* | 10/2011 | Nessjoen ............ E21B 44/00 700/280 |
| 2011/0301872 A1* | 12/2011 | Hedin ............ G01H 1/003 702/34 |
| 2013/0248248 A1* | 9/2013 | Steidl ............ E21B 44/00 175/24 |
| 2013/0277110 A1* | 10/2013 | Doris ............ E21B 44/00 175/24 |
| 2015/0107897 A1 | 4/2015 | Nessjoen et al. |
| 2015/0322766 A1* | 11/2015 | Veltman ............ E21B 44/00 340/853.6 |
| 2016/0168973 A1 | 6/2016 | Dykstra et al. |
| 2016/0194649 A1 | 7/2016 | Yohn |
| 2016/0237802 A1 | 8/2016 | Boone et al. |
| 2016/0273332 A1* | 9/2016 | Dwars ............ E21B 44/00 |
| 2016/0281488 A1 | 9/2016 | Dwars et al. |
| 2017/0101861 A1 | 4/2017 | Kyllingstad |

FOREIGN PATENT DOCUMENTS

| | | |
|---|---|---|
| EP | 2559846 A2 | 2/2013 |
| WO | 2010/063982 A1 | 6/2010 |
| WO | 2012041745 A1 | 4/2012 |
| WO | 2012084886 A1 | 6/2012 |

OTHER PUBLICATIONS

Wikipedia entry for Torque from internetarchive.org, taken from Mar. 3, 2013 entry URL<https://web.archive.org/web/20130303113811/https://en.wikipedia.org/wiki/Torque> (Year: 2013).*
E. Kreuzer et al. "Controlling torsional vibrations of drill strings via decomposition of traveling waves", Jul. 2011, obtained from the Internet URL< https://link.springer.com/article/10.1007/s00419-011-0570-8> (Year: 2011).*
Halsey et al., "Torque Feedback Used to Cure Slip-Stick Motion", SPE 18049, 63rd Annual Technical Conference and Exhibition of the Society of Petroleum Engineers, Oct. 2-5, 1988, pp. 277-282.
Grigg et al., "Predicting Phase Behavior of Mixtures of Reservoir Fluids with Carbon Dioxide", SPE 11960, Society of Petroleum Engineers of AIME, 1983, 12 pages.
Stockhausen et la., "Continuous Direction and Inclination Measurements Lead to an Improvement in Wellbore Positioning", SPE/IADC 79917, SPE/IADC Drilling Conference, 2003, 16 pages.

* cited by examiner

DRILLING SYSTEM CONTROL FOR REDUCING STICK-SLIP BY CALCULATING AND REDUCING ENERGY OF UPGOING ROTATIONAL WAVES IN A DRILLSTRING

BACKGROUND

Embodiments of the present disclosure relate to a method and controller for controlling a drilling system.

Drilling an oil and/or gas well may involve drilling a borehole of considerable length; boreholes are often up to several kilometres vertically and/or horizontally in length. The drillstring comprises a drill bit at its lower end and lengths of drill pipe that are screwed/coupled together. A drive mechanism at the surface rotates the drill bit against a face of the earth formation to drill the borehole through the earth formation. The drilling mechanism may be a top drive, a rotary table or the like.

The drillstring undergoes complicated dynamic behaviour in the borehole during the drilling procedure, which complicated behaviour may include axial, lateral and torsional vibrations as well as frictional and vibrational interactions with the borehole. Simultaneous measurements of drilling rotation at the surface and at the bit have revealed that while the top of the drill string rotates with a constant angular velocity, the drill bit may rotate with varying angular velocities. In extreme cases, known as stick-slip, the drill bit or another portion of the drillstring may stop rotating in the borehole, as a result, the drill string continues to be twisted/rotated until the bit rotates again, after which it accelerates to an angular velocity that is much higher than the angular velocity of the top of the drillstring.

Stick-slip is a recognized problem in the drilling industry and may result in a reduced rate of penetration through the earth formation, bit wear, tool failures and/or the like. The sticking of the drill bit in the borehole may reduce drilling rates, result in torsional damage to the drillstring and the fast rotation of the drill bit, when it is unstuck, may cause damage to the drilling system.

Previously, methods have been proposed for detecting stick-slip and mitigating its effect by changing the rotation speed of the top drive, the weight on bit and/or the like. Other more active methods, have sought to dampen the oscillations of the drillstring in the borehole to prevent stick-slip. However, measures taken to dampen oscillations and prevent stick-slip, for example by adjusting drilling speed, weight on bit and/or the like, may run contrary to and not take account of the drilling parameters necessary/desirable for optimal drilling, such as optimum rate of penetration or the like. Further, a controller may have determined an optimal, desired rate of rotation of the top drive or the like to produce desired drilling of the borehole. Methods of controlling rotational vibrations using a control system have previously been described that provide for reducing the amplitude of a rotational resonance of the drillstring. Such active methods of damping oscillations may adversely affect the rate of drilling and/or move the drilling speed away from the desired rate. Moreover, previously, these damping operations were determined mainly based upon factors for mitigation/prevention of stick-slip.

U.S. Pat. No. 5,117,926 proposes an analogue approach for controlling vibrations using energy flows, where the energy is defined as the product of an "across variable", which for rotational oscillations is the rotation speed, and a "through variable". Fluctuations in one are controlled by varying the other.

U.S. Patent Pub. No. 2011/0232966 proposes employing variation in control parameters within a top drive controller to suppress rotational oscillations. If the controller is a proportional-integral (PI) controller, then by suitably adjusting the integral constant, oscillation suppression may be achieved at a desired frequency. However, the method must be adjusted as the drillstring length changes and the main oscillation frequency changes. It also requires an ability to directly interfere in the top drive controller.

WO 2012/041745 proposes measuring rotation speed in the drillstring at two locations, along its length at or near the surface, and differencing them. This approach is both inconvenient (measurement along the drillstring that does not interfere with the drilling process is difficult), and error-prone (the difference between the two measurements is small).

WO 2012/084886 proposes employing a mathematical model of the whole drillstring, and controlling the surface torque in order to reduce a modelled downhole rotation speed. Similarly to U.S. Patent Pub. No. 2011/0232966, the model must be adjusted as the drillstring length changes, and errors in the model result in reduced performance.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth.

In a first aspect, an embodiment of the present invention provides a method for controlling a drilling system that includes a drive system, drillstring and drill bit, wherein in use the drive system rotates the drillstring during a drilling process to drill a borehole through an earth formation. The control method comprises setting a desired rotation speed $v_0$ for the drillstring; receiving measurements of parameters for the drilling system and deriving from the measured parameters a component $v_{up}$ of the rotation speed of the drillstring associated with upgoing rotational energy; determining a rotation speed $v$ for the drillstring by optimizing an expression which reconciles two conflicting objectives of: (i) maintaining a stable rotation speed centred on $v_0$, and (ii) minimizing the downgoing rotational energy, the optimized expression expressing $v$ in terms of $v_0$ and $v_{up}$; and controlling the drive system to rotate the drillstring at $v$.

The method may further comprise measuring the properties of the drilling system from which $v_{up}$ is derived.

By controlling the drive system on the basis of the optimized expression, it is possible to reduce the amplitude of rotational resonances. In embodiments of the present invention, the optimization adapts to changes in the resonant frequency of the drilling system, e.g. caused by increases in the length of the drillstring. In addition, in embodiments of the present disclosure, it is not necessary to determine or model accurately the resonant frequency of the drilling system. Further, in some embodiments, the method of control may be applied to existing drilling systems, e.g. by implementing the method in a form of an outer controller to an existing drive system controller.

In some embodiments of the present disclosure, the optimized expression expresses $v$ in terms of $v_0$ and $v_{up}$. However, it is possible to write equivalent expressions for $v$ in terms of e.g. $v_0$ and $v_{down}$ (the component of the rotation speed associated with downgoing rotational energy), or $v_{up}$ and $v_{down}$. For the avoidance of doubt, references to the optimized expression and to the quantities $v_0$ and $v_{up}$ used in the optimized expression include such equivalent expressions and the corresponding quantities used therein.

In a second aspect, some embodiments of the present disclosure provide a controller (e.g. a computer-based digital controller) for controlling a drilling system. The controller may comprise a drive system, drillstring and drill bit, where the drive system rotates the drillstring during a drilling process to drill a borehole through an earth formation, the controller being configured to perform the methods of the first aspect.

For example, the controller may comprise a memory to store a desired rotation speed $v_0$ for the drillstring, and one or more processors configured to receive measurements of parameters for the drilling system and derive a component $v_{up}$ of the rotation speed of the drillstring associated with upgoing rotational energy; determine a rotation speed v for the drillstring by optimizing an expression which reconciles two conflicting objectives of: (i) maintaining a stable rotation speed centred on $v_0$, and (ii) minimizing the downgoing rotational energy, the optimized expression expressing v in terms of $v_0$ and $v_{up}$; and control the drive system to rotate the drillstring at v In a third aspect, some embodiments of the present disclosure provide a combination of the controller of the second aspect and one or more sensors for measuring the properties of the drilling system from which $v_{up}$ is derived.

In a fourth aspect, some embodiments of the present disclosure provide a drilling system, comprising a drive system, drillstring and drill bit, wherein the drive system rotates the drillstring during a drilling process to drill a borehole through an earth formation; wherein the drilling system further comprises the controller of the second aspect, or the combination of the controller and the sensors of the third aspect.

Further aspects of the present invention provide: a computer program comprising code which, when run on a computer, causes the computer to perform the method of the first aspect; and a computer readable medium storing a computer program comprising code which, when run on a computer, causes the computer to perform the method of the first aspect.

Optional features of the invention will now be set out. These are applicable singly or in any combination with any aspect/embodiment of the invention.

In some embodiments of the present disclosure, the determined and controlled rotation speed v may be the surface rotation speed of the drillstring, the component $v_{up}$ may be the surface component of the rotation speed, and the desired rotation speed $v_0$ may be the surface desired rotation speed for the drillstring.

In general, in some embodiments of the present disclosure, the steps of: (i) receiving property measurements, and deriving v.sub.up therefrom; (ii) determining a rotation speed v; and (iii) controlling the drive system may be performed repeatedly. The repeat interval may in some embodiments be sufficiently short that these steps are repeated multiple times during the dominant rotational resonance of the system, which in seconds may approximately be the length L of the drillstring in metres divided by 750. Thus, for example, the repeat interval may be less than 0.25(L/750), and preferably less than 0.1(L/750). For applicability to a wide range of drillstring lengths, the repeat interval may be 0.25 s or less, 0.1 s or less and/or the like. If a low pass filter is applied to v.sub.up, as described below, the minimum repeat interval may be the inverse of the Nyquist frequency of the low-pass filter cut-off (i.e. 2 divided by the cut-off frequency). If the data is not low pass filtered, then 0.025 seconds is a reasonable minimum repeat interval.

The drive system may comprise a top drive.

The optimized expression may include a residual correction term to account for long term averaging of the rotation speed over time scales greater than the resonance time of the drilling system. For example, the long term averaging may be over time scales of 60 seconds or greater.

A high-pass filter may be applied to $v_{up}$, the cut-off frequency of the high-pass filter being less than the resonance frequency of the drilling system. For example, the cut-off frequency of the high-pass filter may be 0.017 Hz or lower. Such a high-pass filter can take the place of the residual correction term for accounting for long term averaging of the rotation speed, although such a term may still be useful for avoiding drift from noise or calculation error.

A low-pass filter may be applied to $v_{up}$, the cut-off frequency of the low-pass filter being greater than the resonance frequency of the drilling system. For example, the cut-off frequency of the low-pass filter may be 10 Hz or higher. The use of such a low-pass filter can help to avoid high-frequency noise being sent as a control signal to the drive system.

A maximum and/or a minimum bound may be imposed on v. For example, if the bit sticks hard, it is possible for the drillstring rotation to stop completely. Thus, a minimum bound may be imposed, such as: a fraction (e.g. half or three-quarters) of the desired rotation speed $v_0$; or an absolute value of rotation speed (e.g. 40 revolutions per minute); or a combination of the two (e.g. the lower of 40 revolutions per minute and three-quarters of the desired rotation speed). Similarly, in order e.g. to reduce vibration on the rig, or due to limitations of the drive system gearbox, there may be a maximum bound imposed, such as: a multiple of (e.g. twice) the desired speed $v_0$; or an absolute value of rotation speed (e.g. 200 revolutions per minute); or a combination of the two (e.g. the lower of twice the desired rotation speed and 200 revolutions per minute).

In some embodiments of the present disclosure, $v_{up}$ may be derived from measured properties which are: the actual rotation speed of the drillstring, and a torque T in the drillstring (e.g. the torque T in the drillstring at the surface). Thus, a linear combination of the rotation speed and torque may be used to control the rotation speed. The derivation of $v_{up}$ may be improved by a further measured property, which is the rotational impedance of the drillstring z, although the method is generally robust to errors in the value of z. The actual rotation speed of the drillstring may be measured independently. Another option, however, is to take as the measured actual rotation speed the value of the rotation speed v used to control the drive system at a previous repeat interval.

BRIEF DESCRIPTION OF THE DRAWINGS

The present disclosure is described in conjunction with the appended figures. It is emphasized that, in accordance with the standard practice in the industry, various features are not drawn to scale. In fact, the dimensions of the various features may be arbitrarily increased or reduced for clarity of discussion.

Figure 1:
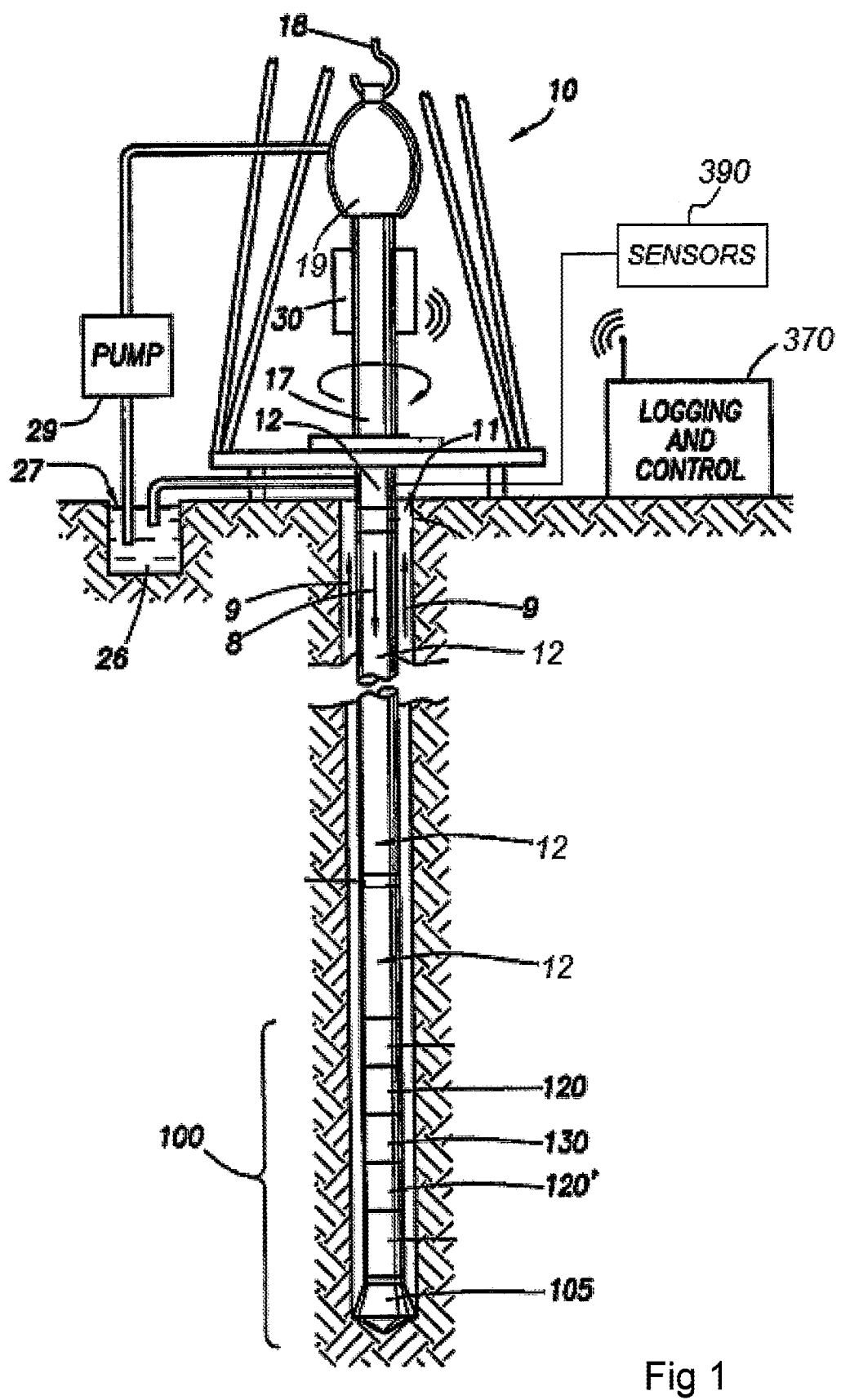
FIG. 1 illustrates a drilling system for operation at a wellsite to drill a borehole through an earth formation.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Embodiments of the present invention relates to controlling/driving a drilling system—comprising a top drive, a drillstring and a drill bit—to drill a borehole through an earth formation. Embodiments of the present invention provide for driving the drill bit with the top drive to optimize the speed of rotation of the drill bit while minimizing downgoing energy traveling down the drillstring during the drilling procedure.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention, it being understood that various changes may be made in the function and arrangement of elements without departing from the scope of the invention.

Specific details are given in the following description to provide a thorough understanding of the embodiments. However, it will be understood by one of ordinary skill in the art that embodiments may be practiced without these specific details. For example, well-known circuits, processes, algorithms, structures, and techniques may be shown without unnecessary detail in order to avoid obscuring the embodiments.

As disclosed herein, the term "computer readable medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

FIG. 1 illustrates a drilling system for operation at a wellsite to drill a borehole through an earth formation. The wellsite can be located onshore or offshore. In this system, a borehole 11 is formed in subsurface formations by rotary drilling in a manner that is well known. Systems can also use be used in directional drilling systems, pilot hole drilling systems, casing drilling systems and/or the like.

A drillstring 12 is suspended within the borehole 11 and has a bottomhole assembly 100, which includes a drill bit 105 at its lower end. The surface system includes a platform and derrick assembly 10 positioned over the borehole 11, the assembly 10 including a top drive 30, kelly 17, hook 18 and rotary swivel 19. The drillstring 12 is rotated by the top drive 30, energized by means not shown, which engages the kelly 17 at the upper end of the drillstring. The drillstring 12 is suspended from a hook 18, attached to a traveling block (also not shown), through the kelly 17 and the rotary swivel 19 which permits rotation of the drillstring relative to the hook. As is well known, a rotary table system could alternatively be used to rotate the drillstring 12 in the borehole and, thus rotate the drill bit 105 against a face of the earth formation at the bottom of the borehole.

The surface system can further include drilling fluid or mud 26 stored in a pit 27 formed at the well site. A pump 29 delivers the drilling fluid 26 to the interior of the drillstring 12 via a port in the swivel 19, causing the drilling fluid to flow downwardly through the drillstring 12 as indicated by the directional arrow 8. The drilling fluid exits the drillstring 12 via ports in the drill bit 105, and then circulates upwardly through the annulus region between the outside of the drillstring and the wall of the borehole, as indicated by the directional arrows 9. In this well-known manner, the drilling fluid lubricates the drill bit 105 and carries formation cuttings up to the surface as it is returned to the pit 27 for recirculation.

The bottomhole assembly 100 may include a logging-while-drilling (LWD) module 120, a measuring-while-drilling (MWD) module 130, a rotary-steerable system and motor, and drill bit 105.

The LWD module 120 may be housed in a special type of drill collar, as is known in the art, and can contain one or a plurality of known types of logging tools. It will also be understood that more than one LWD and/or MWD module can be employed, e.g. as represented at 120'. The LWD module may include capabilities for measuring, processing, and storing information, as well as for communicating with the surface equipment. The LWD module may include a fluid sampling device.

The MWD module 130 may also be housed in a special type of drill collar, as is known in the art, and can contain one or more devices for measuring characteristics of the drillstring and drill bit. The MWD tool may further includes an apparatus (not shown) for generating electrical power to the downhole system. This may typically include a mud turbine generator powered by the flow of the drilling fluid, it being understood that other power and/or battery systems may be employed. The MWD module may include one or more of the following types of measuring devices: a weight-on-bit measuring device, a torque measuring device, a vibration measuring device, a shock measuring device, a stick slip measuring device, a direction measuring device, a rotation speed measuring device, and an inclination measuring device.

A control unit 370 may be used to control the top drive 30 or other drive system. The top drive 30 may rotate the drillstring 12 at a rotation speed to produce desired drilling parameters. By way of example, the speed of rotation of the drillstring may be: determined so as to optimize a rate of penetration through the earth formation, set to reduce drill bit wear, adjusted according to properties of the earth formation, or the like.

Sensors 390 may measure properties of the drillstring 12. Conveniently, the sensors 390 may be coupled with the drillstring 12 above or near the surface, although they may be distributed along the drillstring 12. The sensors may measure properties of the drillstring 12 from which upgoing/downgoing energy in the drillstring 12 and/or upgoing/downgoing components of the rotation of the drillstring 12 may be determined/estimated. For example, a speed of rotation of the drillstring may be determined. For example, the sensors 390 may measure torque of the drillstring 12, speed of rotation of the drillstring 12 and/or rotational impedance of the drillstring 12 and the upgoing/downgoing energy in the drillstring 12 and/or upgoing/downgoing components of the rotation of the drillstring 12 may be processed from the sensed measurements.

The approach of the present invention allows the rotational oscillations of suspended tubulars to be controlled. In this way, the rotational motion of a drillstring can be stabilized, but the approach could equally well be applied to tubulars used for completing a well, such as casing or running in a liner or completion. Both the parameters/conditions desirable for optimal/desired drilling operation of the drilling system and the parameters/conditions for preventing/mitigating stick-slip can be processed/controlled during the drilling operation.

In the drillstring during the drilling of the borehole there are rotational waves going up and down the drillstring. The reflections of the upgoing waves into downgoing waves at the surface produce the large rotational resonances in, and repetitive stick-slip motion of, the drilling system.

The downgoing waves in the drillstring also include those initiated by the system driving the drillstring, i.e. the top drive or the like. These downgoing waves in the drillstring produced by the drive system are required in order to drive the drill bit to drill through the earth formation. As such, the downgoing energy comprises desirable downgoing energy that is used to drive the drill bit and undesirable downward energy that causes oscillation in the drillstring and/or stick slip. Consequently, systems and methods can be provided which aim to achieve a desired rotation speed of the drillstring (hereinafter referred to as $v_0$) while minimising the amount of energy contained in the downgoing rotation (the downgoing rotation is hereinafter referred to as $v_{down}$).

Thus in general, a processor may determine an optimized speed of rotation for the drillstring 12, wherein the optimized speed of rotation balances/optimizes delivery of rotational energy to the drill bit against reduction of energy travelling down the drillstring 12. More particularly, the control unit 370 can provide an outer control system used to control a fast, built-in control system for the top drive 30; wherein a desired/determined rotation speed is provided to the built-in control system, which attempts to achieve the particular rotation speed, and the outer control system controls the top drive to vary the rotation speed around the desired/determined rotation speed to reduce the amount of downgoing energy.

The contrary objectives of maximizing energy sent down the drillstring to the drill bit by rotating the drillstring and minimizing downgoing energy to prevent large oscillations of the drillstring in the borehole and/or stick-slip may be viewed as a minimization constraint that can be written as minimizing E such that:

$$E = (v - v_0)^2 + \lambda v_{down}^2 \qquad (1)$$
$$= (v - v_0)^2 + \lambda(v - v_{up})^2$$

where:
$v_0$ is the desired average rotation speed
$v$ is the determined rotation speed to be fed to the top-drive and is the sum of $v_{up}$ and $v_{down}$; and
$\lambda$ is a constant that reflects a relative weight given to the two conflicting objectives.

Equation (1) can be embodied in an algorithm which determines a rotation speed $v$ that is then passed to the top-drive controller, on the assumption that the controller is able to exactly achieve that speed. While modern top-drive controllers are normally able to achieve close to a commanded speed, there will inevitably be small differences between actual and the commanded speeds. Such small differences do not invalidate the control algorithm.

Thus, when $v$ appears on the left-hand-side of an equation it should be interpreted as the commanded rotation speed to be sent to the top-drive controller. When it appears on the right-hand-side of an equation, it is preferably the most recent actual measured rotation speed of the top-drive, although if this is not available, the most recent previous commanded rotation speed can be substituted.

The upgoing component of the rotation speed may be estimated from simultaneous surface measurements of the rotation speed and torque in the drillstring (T). A rotational impedance of the pipe $z$ may be determined, i.e., from pipe dimension or the like at the surface. The downgoing and upgoing components of the rotation may then be given by:

$$v_{down} = \frac{1}{2}\left(v + \frac{T}{z}\right)$$
$$v_{up} = \frac{1}{2}\left(v - \frac{T}{z}\right)$$

where $z$ is the pipe impedance.

The corresponding upgoing and downgoing energies are proportional to $v^2_{down}$ and $v^2_{up}$ and their sum is proportional to the total rotational energy of the drillstring:

$$v_{up}^2 + v_{down}^2 = \frac{1}{2}v^2 + \frac{1}{2z^2}T^2$$

Although it is desirable for the correct value of $z$ to be used, the controller is generally robust to errors in the value of $z$.

The solution to equation (1) is given by:

$$v = \frac{v_0 + \lambda v_{up}}{1 + \lambda}$$

However, this solution provides a slower mean rotation speed for the drillstring than is desirable, i.e., the rotation speed reduces downgoing energy and thus reduces oscillation of the drillstring, but the downgoing energy is so low it produces slow rotation of the drill bit and undesirable drilling speeds. Accordingly, the minimization constraint can be rewritten as:

$$E = v - (1+\lambda)v_0)^2 + \lambda v_{down}^2$$

A solution of this minimization constraint is:

$$v = v_0 + \frac{\lambda}{1+\lambda} v_{up}$$

The term $v_{up}$ on the right hand side is calculated from the most recent measurements of torque and rotation speed, and thus there is a slight lag. In some embodiments of the present disclosure, this lag is configured to be less than at least one quarter of the period of the dominant resonance of the rotation system.

In some embodiments of the present disclosure, a residual correction term r may be included in the solution to account for the long term average of the rotation speed. This then provides the following solution for the minimization constraint, where t is the current time and $\delta$ is the sampling interval:

$$v(t) = r(t) + v_0(t) + \frac{\lambda}{1+\lambda} v_{up}(t - \delta) \quad (2)$$

the rate of change of the residual correction being proportional to the difference between the current and desired average rotation speed, as follows:

$$\frac{dr}{dt} = \frac{1}{k}(v - v_0)$$

and k being chosen so that it is long compared to the resonance time of the system. For example, k may be of the order of 60 seconds or longer.

In discrete time, with sampling interval $\delta$, r may be calculated by:

$$r_j = r_{j-1} + \frac{\delta}{k}(v_j - v_{0(j)})$$

A high-pass filter may be applied to the signal $v_{up}$ used in equation (2). This may be done using a one-pole filter, with the same value of k, where:

$$v_{up_j}^l = \left(1 - \frac{\delta}{k}\right) v_{up_{j-1}}^l + \frac{\delta}{k} v_{up_j}$$

$$v_{up_j}^h = v_{up_j} - v_{up_j}^l$$

and where the subscript j indicates the time step, the superscript l indicates the filtered-out low-pass signal, and the superscript h indicates the remaining high-pass signal. The value of $\lambda$ used in equation (2) may be 1. The $\lambda$ parameter controls how much reduction in rotational resonance is to be provided by the control system. For example, when $\lambda$ is set to zero, the control system will provide zero reduction in torsional resonance. The desired torsional resonance control may be selected and this selection may be weighed against other desired drilling parameters.

Figure 2:
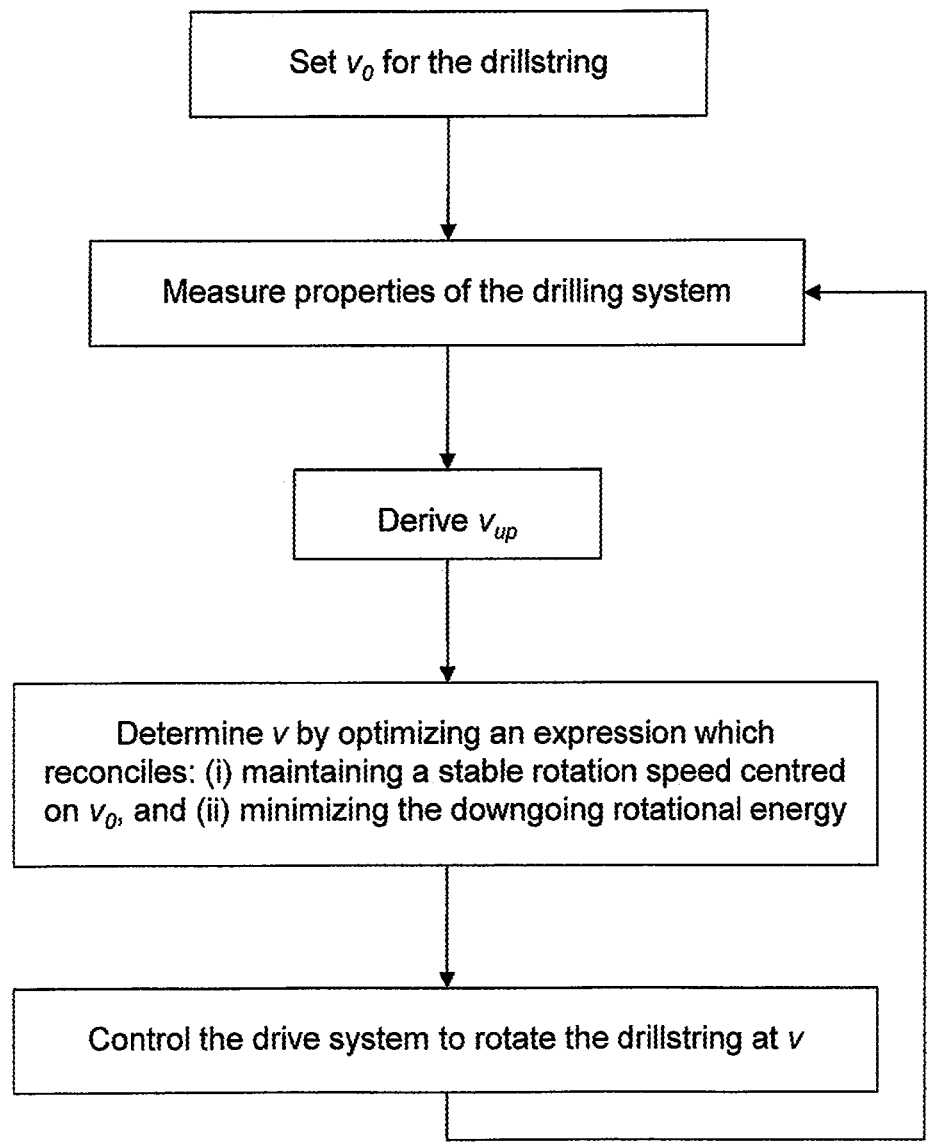
FIG. 2 shows a flow diagram for a drilling control method, in accordance with an embodiment of the present disclosure.

FIG. 2 shows a basic flow diagram for a drilling control method in accordance with an embodiment of the present disclosure that implements a control algorithm based on equation (2). In some embodiments of the present disclosure, after $v_0$ is set in the first step, the algorithm loops around the subsequent steps at a repeat interval that is sufficiently short that the steps are repeated multiple times during the dominant rotational resonance of the system.

When the system is activated, the value of $\lambda$ may vary over time such that initially it is zero or close to zero, and subsequently increases until it reaches a chosen value. In some embodiments of the present disclosure, this method of gradual activation reduces the variation in system behaviour seen in the drilling system.

If the high-pass filter is applied to the upgoing rotation speed $v_{up}$, then theoretically, no residual correction term r is required. However, some embodiments, such a correction term may still be used to avoid drift from noise or calculation error.

In some embodiments of the present disclosure, in order to avoid sending high-frequency noise to the drive system (i.e. the top drive controller or the like) that may interact with the internal control algorithm, the estimate of the upgoing rotation speed may be low-pass filtered. This can be done in the same way as for r, but with a smaller value of k, which can be chosen so that it does not filter out the main rotational resonance of the drillstring. A value for k may, in some embodiments of the present disclosure, be of the order of 0.1 s. A low-pass one-pole filter can be provided according to:

$$v_{up_j}^f = \left(1 - \frac{\delta}{k}\right) v_{up_{j-1}}^f + \frac{\delta}{k} v_{up_j}$$

where the superscript f indicates the filtered signal.

In a drilling system, if the bit sticks hard, it is possible for the drillstring rotation to stop completely. To avoid this, in some embodiments of the present disclosure, a minimum value of v may be imposed. For example, a minimum value of v may be imposed on the control system that is 25% or 50% less than the desired average value $v_0$. It may also be desirable, for reasons such as reducing vibration on the rig, or limitations of the top drive gearbox, for there to be an upper limit on the rotation speed. In a similar manner, In some embodiments of the present disclosure, a maximum value of v may be imposed on the system.

Equation (2) may be rewritten as:

$$v_j = r_j + v_{0(j)} + \frac{\lambda}{1+\lambda} v_{up_{j-1}}^f$$

As noted above, in some embodiments of the present disclosure, the energy optimization algorithm may be processed in a processor for desired drilling speeds and the speed of rotation of the drillstring may be controlled in accordance with the output of the optimization algorithm. For example, the control unit 370 may be a secondary controller that controls the top drive 30 or the like to control the rotation speed the drillstring is being driven at in accordance with the output of the optimization algorithm. In particular, a primary (e.g. built in) control system may control the top drive or the like to drive the drillstring at a desired speed of rotation and the secondary controller may control the top drive or the like to drive the drillstring at rotation speeds around/proximal to the desired speed of rotation. Use of such a secondary controller means that existing control systems can be modified to implement control methods in accordance with the present invention.

All references referred to above are hereby incorporated by reference for all purposes. While the principles of the disclosure have been described above in connection with specific apparatuses and methods, it is to be clearly understood that this description is made only by way of example and not as limitation on the scope of the invention.

Numbered Clauses Relating to the Invention

[Clause 1] A method for controlling a drilling system, comprising a drive system, drillstring and drill bit, wherein the drive system rotates the drillstring during a drilling process to drill a borehole through an earth formation, comprising:
receiving a desired/set speed of rotation of the drillstring;
determining an upgoing energy component for rotational energy traveling up the rotating drillstring;
determining a downgoing energy component for energy traveling down the rotating drillstring; and
deriving an optimal rotation speed for the drillstring that constrains the downgoing rotational energy.

[Clause 2] The method of Clause 1, further comprising:
controlling the drive system to rotate the drillstring at the optimal rotation speed.

[Clause 3] The method of Clause 1 or 2, wherein the drive system comprises a top drive.

[Clause 4] The method of any one of the previous Clauses, wherein the determining the upgoing energy component and the determining the downgoing energy component comprises measuring at least one of an actual rotation speed of the drillstring, a torque applied to the drillstring and a rotational impedance of the drillstring and processing the measurements of the at least one of the actual rotation speed of the drillstring, the torque applied to the drillstring and the rotational impedance of the drillstring to determine the upgoing energy component and the downgoing energy component.

[Clause 5] The method of any one of the previous Clauses, wherein the optimal rotation speed comprises a rotation speed that combines constraints on the variation of the optimal rotation speed from the desired/set speed of rotation and on the downgoing energy component.

[Clause 6] The method of any one of the previous Clauses, wherein additional bounds are put on the optimal rotation speed, either a maximum or a minimum rotation speed or both

[Clause 7] The method of any one of the previous Clauses, wherein the speed of rotation of the drillstring comprises an angular velocity of the drillstring.

[Clause 8] A system for controlling a drilling system, the drilling system comprising a drive system, drillstring and drill bit, wherein the drive system rotates the drillstring during a drilling process to drill a borehole through an earth formation, comprising:
a control system configured to drive the drillstring to rotate at a desired/set speed of rotation;
one or more sensors coupled with at least one of the drive system and the drillstring and configured to measure parameters for determining an upgoing energy component and a downgoing energy component of energy traveling along the rotating drillstring; and
a processor configured to process an optimal rotation speed for the drillstring to provide for an optimal rotation speed for the drillstring that constrains the downgoing rotational energy.

[Clause 9] A method for controlling a drilling system, comprising a drive system, drillstring and drill bit, wherein the drive system rotates the drillstring during a drilling process to drill a borehole through an earth formation, comprising:
receiving a desired/set speed of rotation of the drillstring;
determining a downgoing energy component for energy traveling down the rotating drillstring; and
deriving an optimal rotation speed for the drillstring where a combination of the variation between the optimal and desired rotation speed, and the downgoing rotational energy is minimised.

The invention claimed is:

1. A method for controlling a drilling system comprising a drive system, drillstring and drill bit, wherein the drive system rotates the drillstring during a drilling process to drill a borehole through an earth formation in a manner that reduces stick-slip, the method comprising:
receiving a desired rotation speed $v_0$ of the drive system to rotate the drillstring;
receiving property measurements of the drilling system and deriving therefrom a rotation speed $v_{up}$ of upgoing rotational waves of the drillstring associated with upgoing rotational energy in the drillstring;
determining an actual rotation speed v of the drive system to rotate the drillstring by:
representing energy in the drillstring as a mathematical expression comprising a sum of rotational energy produced by the drive system and downgoing rotational energy caused by the upgoing rotational waves that are reflected at an upper end of the drillstring into downgoing rotational waves, wherein the rotational energy produced by the drive system is a function of v and $v_0$, and wherein the downgoing rotational energy caused by the upgoing rotational waves is a function of v and $v_{up}$; and
optimizing the mathematical expression, the optimized mathematical expression expressing v in terms of $v_0$ and $v_{up}$; and
controlling the drive system to rotate the drillstring at v, wherein the energy in the drillstring is proportional to the mathematical expression comprising $(v-v_0)^2 + \lambda(v-v_{up})^2$, where $\lambda$ is a coefficient of relative weight ranging between zero and one.

2. A method according to claim 1, wherein: the receiving of property measurements and deriving $v_{up}$ therefrom; the determining of v; and the controlling of the drive system are performed repeatedly.

3. A method according to claim 1, wherein the drive system comprises a top drive.

4. A method according to claim 1, wherein the optimized mathematical expression includes a residual correction term r to account for long term averaging of $v_0$ over time scales greater than the resonance time of the drilling system.

5. A method according to claim 1, wherein a high-pass filter is applied to $v_{up}$, and wherein a cut-off frequency of the high-pass filter is less than the resonance frequency of the drilling system.

6. A method according to claim 1, wherein a low-pass filter is applied to $v_{up}$, and wherein a cut-off frequency of the low-pass filter is greater than the resonance frequency of the drilling system.

7. A method according to claim 1, wherein a maximum and/or a minimum bound is imposed on v.

8. A method according to claim 1, wherein $v_{up}$ is derived from surface measured properties comprising: rotational speed of the drillstring and a torque T in the drillstring.

9. A controller for controlling a drilling system, comprising a drive system, drillstring and drill bit, wherein the drive system rotates the drillstring during a drilling process to drill a borehole through an earth formation, the controller being configured to perform the method of claim 1.

10. A combination of the controller of claim 9 and one or more sensors for measuring the properties of the drilling system from which $v_{up}$ is derived.

11. A drilling system, comprising a drive system, drillstring and drill bit, wherein the drive system rotates the drillstring during a drilling process to drill a borehole through an earth formation;
wherein the drilling system further comprises the controller of claim 9, or the combination of the controller and the sensors of claim 10.

12. A non-transitory computer readable medium storing a computer program comprising code which, when run on a computer, causes the computer to perform the method of claim 1.

13. A method for controlling a drilling system comprising a drive system, drillstring and drill bit, wherein the drive system rotates the drillstring during a drilling process to drill a borehole through an earth formation in a manner that reduces stick-slip, the method comprising:
receiving a desired rotation speed $v_0$ of the drive system to rotate the drillstring;
receiving property measurements of the drilling system and deriving therefrom a rotation speed $v_{up}$ of upgoing rotational waves of the drillstring associated with upgoing rotational energy in the drillstring;
determining an actual rotation speed v of the drive system to rotate the drillstring by:
representing energy in the drillstring as a mathematical expression comprising a sum of rotational energy produced by the drive system and downgoing rotational energy caused by the upgoing rotational waves that are reflected at an upper end of the drillstring into downgoing rotational waves, wherein the rotational energy produced by the drive system is a function of v and $v_0$, and wherein the downgoing rotational energy caused by the upgoing rotational waves is a function of v and $v_{up}$; and
optimizing the mathematical expression, the optimized mathematical expression expressing v in terms of $v_0$ and $v_{up}$; and
controlling the drive system to rotate the drillstring at v, wherein $v_{up}$ is determined by:

$$v_{up} = \frac{1}{2}\left(v - \frac{T}{z}\right)$$

where v is a surface measurement of rotational speed of the drillstring, T is a surface measurement of torque in the drillstring, and z is rotational impedance of the drillstring.

14. A method for controlling a drilling system comprising a drive system, drillstring and drill bit, wherein the drive system rotates the drillstring during a drilling process to drill a borehole through an earth formation in a manner that reduces stick-slip, the method comprising:
receiving a desired rotation speed $v_0$ of the drive system to rotate the drillstring;
receiving property measurements of the drilling system and deriving therefrom a rotation speed $v_{up}$ of upgoing rotational waves of the drillstring associated with upgoing rotational energy in the drillstring;
determining an actual rotation speed v of the drive system to rotate the drillstring by:
representing energy in the drillstring as a mathematical expression comprising a sum of rotational energy produced by the drive system and downgoing rotational energy caused by the upgoing rotational waves that are reflected at an upper end of the drillstring into downgoing rotational waves, wherein the rotational energy produced by the drive system is a function of v and $v_0$, and wherein the downgoing rotational energy caused by the upgoing rotational waves is a function of v and $v_{up}$; and
optimizing the mathematical expression, the optimized mathematical expression expressing v in terms of $v_0$ and $v_{up}$; and
controlling the drive system to rotate the drillstring at v, wherein the optimized mathematical expression is:

$$v = v_0 + \frac{\lambda}{1+\lambda} v_{up}$$

where $\lambda$ is a coefficient of relative weight ranging between zero and one.

15. A method for controlling a drilling system comprising a drive system, drillstring and drill bit, wherein the drive system rotates the drillstring during a drilling process to drill a borehole through an earth formation in a manner that reduces stick-slip, the method comprising:
receiving a desired rotation speed $v_0$ of the drive system to rotate the drillstring;
receiving property measurements of the drilling system and deriving therefrom a rotation speed $v_{up}$ of upgoing rotational waves of the drillstring associated with upgoing rotational energy in the drillstring;
determining an actual rotation speed v of the drive system to rotate the drillstring by:
representing energy in the drillstring as a mathematical expression comprising a sum of rotational energy produced by the drive system and downgoing rotational energy caused by the upgoing rotational waves that are reflected at an upper end of the drillstring into downgoing rotational waves, wherein the rotational energy produced by the drive system is a function of v and $v_0$, and wherein the downgoing rotational energy caused by the upgoing rotational waves is a function of v and $v_{up}$; and
optimizing the mathematical expression, the optimized mathematical expression expressing v in terms of $v_0$ and $v_{up}$; and
controlling the drive system to rotate the drillstring at v, wherein the mathematical expression comprises the expression $(v-v_0)^2$.

16. A method for controlling a drilling system comprising a drive system, drillstring and drill bit, wherein the drive system rotates the drillstring during a drilling process to drill a borehole through an earth formation in a manner that reduces stick-slip, the method comprising:
receiving a desired rotation speed $v_0$ of the drive system to rotate the drillstring;

receiving property measurements of the drilling system and deriving therefrom a rotation speed $v_{up}$ of upgoing rotational waves of the drillstring associated with upgoing rotational energy in the drillstring;

determining an actual rotation speed v of the drive system to rotate the drillstring by:

representing energy in the drillstring as a mathematical expression comprising a sum of rotational energy produced by the drive system and downgoing rotational energy caused by the upgoing rotational waves that are reflected at an upper end of the drillstring into downgoing rotational waves, wherein the rotational energy produced by the drive system is a function of v and $v_0$, and wherein the downgoing rotational energy caused by the upgoing rotational waves is a function of v and $v_{up}$; and optimizing the mathematical expression, the optimized mathematical expression expressing v in terms of $v_0$ and $v_{up}$; and controlling the drive system to rotate the drillstring at v, wherein the mathematical expression comprises the expression $(v-v_{up})^2$.

* * * * *